C. C. GRAY.
CHAIN TIGHTENER.
APPLICATION FILED OCT. 13, 1919.
1,348,168.
Patented Aug. 3, 1920.
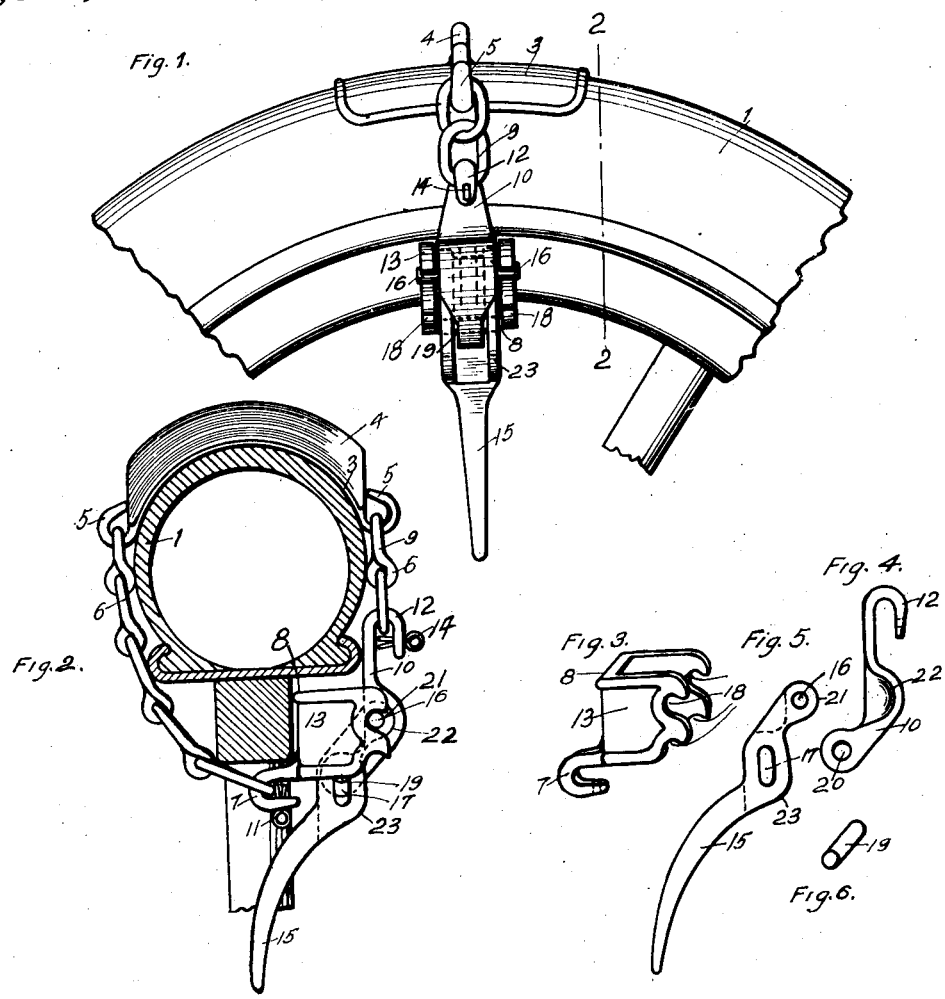
Inventor
Carl C. Gray.
By Alfred T. Gage
Attorney

UNITED STATES PATENT OFFICE.

CARL C. GRAY, OF MINNEAPOLIS, MINNESOTA.

CHAIN-TIGHTENER.

1,348,168. Specification of Letters Patent. Patented Aug. 3, 1920.

Application filed October 13, 1919. Serial No. 330,366.

*To all whom it may concern:*

Be it known that I, CARL C. GRAY, citizen of the United States, residing at Minneapolis, in the county of Hennepin and State of Minnesota, have invented certain new and useful Improvements in Chain-Tighteners, of which the following is a specification.

This inventon relates to a chain tightener and particularly to a construction applicable to a mud-hook clamp, and comprises an improvement upon the structure disclosed in my patent No. 1,240,703 dated September 18, 1917.

The invention has for an object to provide a novel and improved construction of locking lever by which a chain or other device may be tightened and secured in position upon the tire of a vehicle.

Another object of the invention is to provide a new structure of bearing plate upon which the locking lever is pivoted and of the connecting hook between said lever and a member to be tightened.

Other and further objects and advantages of the invention will be hereinafter set forth and the novel features thereof defined by the appended claims.

In the drawing—

Figure 1 is a side elevation of the invention applied to a vehicle wheel;

Fig. 2 is a vertical section on line 2—2 of Fig. 1;

Fig. 3 is a detail perspective of the bearing plate;

Fig. 4 is a side elevation of the connecting hook;

Fig. 5 is a similar view of the locking lever; and

Fig. 6 is a detail of the bearing pin between the lever and hook.

Like numerals refer to like parts in the several figures of the drawing.

The invention is capable of various applications and is herein shown as applied for clamping a mud-hook upon the tire 1 of a vehicle wheel. This mud-hook may be of any desired construction, for instance, the segmental plate 3 is provided with a transverse holding rib 4 having at opposite ends the attaching eyes 5. From one of these eyes a chain 6, or other flexible connection extends beneath the wheel felly and is releasably attached to a hook 7 projected from one edge of a bearing plate 8. The chain may be retained in engagement with the hook by a cotter pin 11 or similar device. The plate may be of any desired configuration, preferably a channel iron forming the parallel walls 13 having upon their free edges the seats or bearings 18.

The opposite eye 5 has attached thereto a short chain 9 which releasably engages the clamping hook 10 at its bill 12 and is retained therein by the pin 14. The hook 10 is connected with the plate 8 by a locking lever 15 provided with an elongated bearing slot 17 at the junction of its long and short arms. The hook 10 has a bearing pin 19 secured in the eye 20 thereof and disposed to rotate and travel in the slots 17 in the parallel walls 23 of the lever as the latter is operated. The short arm 21 of the lever is formed with a curved face adapted to engage and traverse the seat 22 intermediate the ends of the hook 10. This short end 21 of the lever is also provided with opposite pivot pins 16 which seat in the recesses 18 and thus form a pivotal bearing for the lever action. This lever lies between the parallel walls of the bearing plate and is guided thereby so that the lever pivot bears in the recesses while its short end engages and draws the hook toward the plate as the long end of the lever is shifted toward the wheel spokes.

In the application and operation of the tightener the bearing plate is placed in contact with one side face of the wheel felly with the fixed hook thereon extending beneath the felly and connected to the chain extending from the mud-hook. With the parts in this position, and the long arm of the lever drawn away from the wheel, the hook pivoted upon the lever is connected to the opposite chain. The lever and its hook are then shifted inward to engage the lever pivot with the plate and the lever then rocked upon its pivot by the inward swing of its long arm which causes its short arm to bear upon the seat of the hook and thus securely lock the device in position. The slidable pivotal connection between the lever and hook permits a long leverage when attaching the device and more length for engagement of the pintles with the base plate when the lever is swung outward, and also effects a toggle leverage drawing the parts into close contact. The structure presents a nested arrangement of the lever between the side walls of the bearing plate and of the hook between the side walls of the lever.

The device may be readily attached or detached from a wheel and greatly reduces and simplifies the number of parts, thus economizing in the practical manufacture thereof and rendering their action both positive and efficient.

While the invention has been disclosed as applied to a mud-hook clamp by means of chains, it is obvious that it may be adapted for other purposes, as the novel features comprise the locking lever carrying the pivoted hook and its mounting in the bearing plate.

What I claim is:—

1. A tightening device comprising a bearing plate provided with an attaching member and pivoting sockets, a locking lever having a pintle to engage said sockets, and a connecting member having a sliding pivotal connection with said lever to permit travel of the inner end of the member thereon and a seat to be engaged by one arm thereof.

2. A tightening device comprising a bearing plate provided with an attaching member and pivoting sockets, a locking lever having an elongated slot and a pintle to engage said sockets, and a connecting member having a sliding pivotal connection with the slot of said lever to permit travel of the inner end of the member thereon and a seat to be engaged by one arm thereof.

3. A tightening device comprising a bearing plate provided with a hook member and pivoting sockets, a locking lever having a pivoting aperture and a pintle to engage said sockets, and a hook member having a pivot pin at one end mounted to travel longitudinally of the lever in said aperture and a curved seat to be engaged by one arm of said lever.

4. A tightening device comprising a bearing plate provided with a hook member and pivoting sockets, a locking lever having a pivoting slot intermediate its ends and a pintle at one end to engage said sockets, and a hook member having a bill at one end and a pivot pin at its opposite end mounted to travel longitudinally of the lever and an intermediate bearing seat to be engaged by one end of said lever.

5. A tightening device comprising a bearing plate provided with a hook member and parallel side walls having pivoting sockets at their free edges, a locking lever disposed between said walls and having parallel side walls provided with pivoting apertures, a pintle extending from one arm of said lever to engage said sockets, and a hook member disposed between the walls of the lever and provided with a lateral pivot to enter the apertures thereof.

6. A tightening device comprising a bearing plate provided with a hook member and parallel side walls having pivoting sockets at their free edges, a locking lever disposed between said walls and having parallel side walls provided with pivoting slots, a pintle extending from a short arm of said lever to engage said sockets, and a hook member disposed between the walls of said lever and provided with a pivot pin adapted to travel in said slots and a seat intermediate its ends to engage the pivoted end of said lever.

7. A tightening device comprising a bearing plate provided with a hook member and parallel side walls having pivoting sockets at their free edges, a retaining pin extending through the bill of said hook member, a locking lever formed with a short arm having a pintle to engage said sockets and parallel slotted side walls intermediate its ends, and a hook member disposed between said walls and having a pivot pin adapted to travel in the slots therein.

8. A tightening device comprising a bearing plate provided with a hook member and parallel side walls having pivoting sockets at their free edges, a retaining pin extending through the bill of said member, a locking lever formed with a short arm having a pintle to engage said sockets and parallel slotted side walls intermediate its ends, a hook member disposed between said walls and pivoted to travel in the slots therein, a curved seat intermediate the ends of said last mentioned hook member and disposed to receive the pivoted end of said lever, and a retaining pin carried by the bill of said last mentioned hook member.

9. A tightening device comprising a bearing plate provided with attaching means and pivoting means, a locking lever constructed to fulcrum upon said pivoting means, and a connecting member having a sliding pivotal connection with said lever intermediate its ends to permit relative movement of the member thereon and a seat to be engaged by one arm of said lever.

In testimony whereof I affix my signature.

CARL C. GRAY.